UNITED STATES PATENT OFFICE.

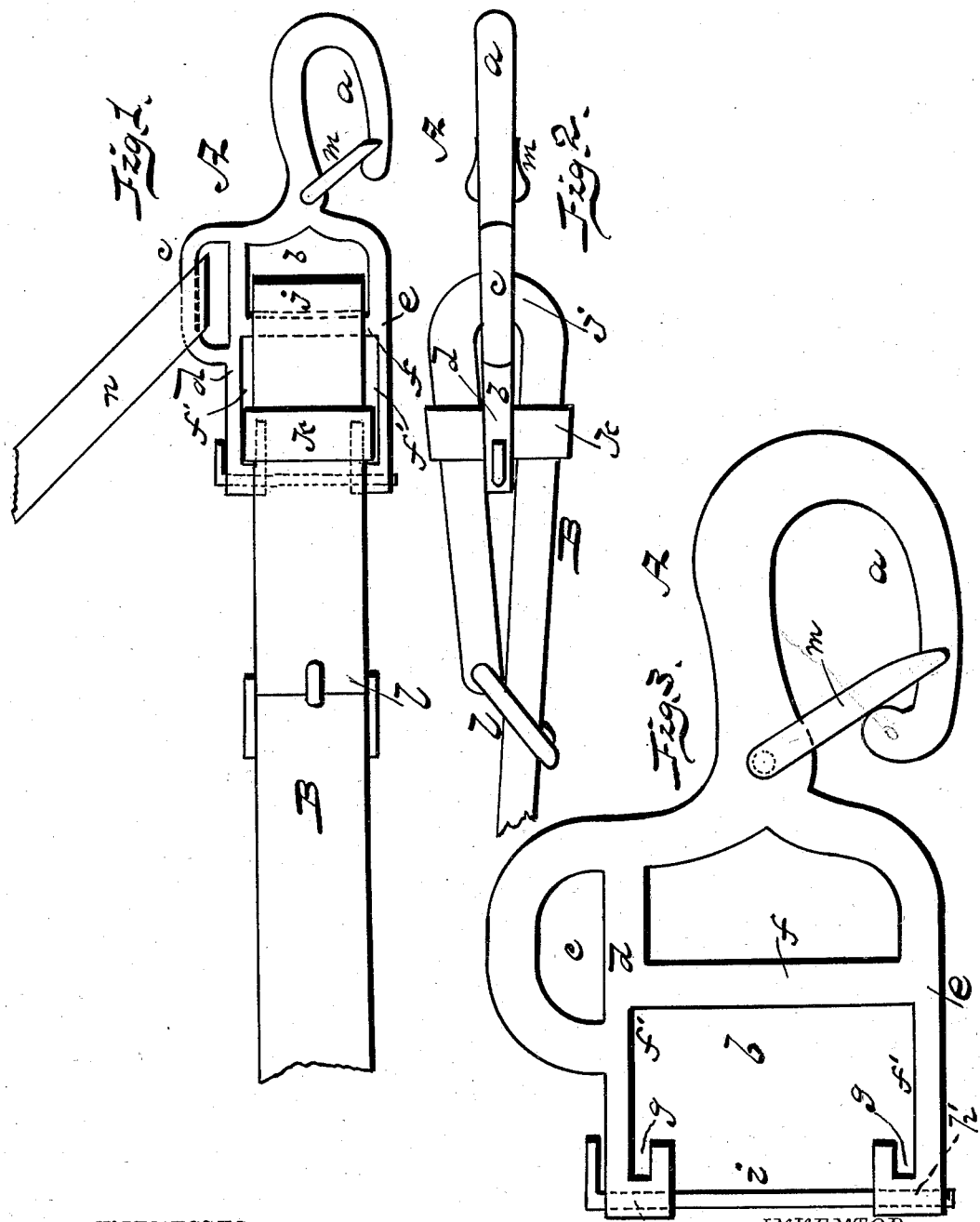

DANIEL W. BROWNELL, OF NEWTON CENTRE, MASSACHUSETTS.

HARNESS-HOOK.

SPECIFICATION forming part of Letters Patent No. 383,341, dated May 22, 1888.

Application filed March 29, 1888. Serial No. 268,751. (No model.)

*To all whom it may concern:*

Be it known that I, DANIEL W. BROWNELL, a citizen of the United States, residing at Newton Centre, in the county of Middlesex and State of Massachusetts, have invented certain new and useful Improvements in Breeching-Hooks; and I do hereby declare the following to be a full, clear, and exact description of the invention, such as will enable others skilled in the art to which it appertains to make and use the same.

This invention relates to an improvement in breeching-hooks; and it consists in the novel construction and arrangement of the same, as will be hereinafter fully described.

The annexed drawings, to which reference is made, fully illustrate my invention, in which—

Figure 1 represents a plan view of my device. Fig. 2 is a side view; and Fig. 3 is also a plan view, enlarged.

Referring by letter to the accompanying drawings, A designates the device, consisting of the hook $a$, frame $b$, and loop $c$, the whole formed integral. The frame $b$ is composed of the upper side bar, $d$, to which is fixed the loop $c$, and a lower side bar, $e$, as well as a cross-bar, $f$, which connects the two parallel upper and lower bars aforesaid. The rear portion of the parallel bars is formed with an offset, as at $f''$, whereby the space in rear of the connecting bar is broadened, providing a wider space than the space in front of said bar, for a purpose hereinafter explained. The rear end of each of the parallel bars is in hook shape, providing a slot, $g$, and said ends are transversely perforated, as at $h$ $h'$, to receive a holding-bar, $i$, which serves to prevent the two ends of the parallel bars from displacement.

B represents a portion of a breeching-strap which connects with the breeching-ring of a harness in the well-known manner, and the opposite end $j$ passes around the connecting-bar $f$ and is provided with the strap-loop $k$, while the extreme end thereof is buckled to the main portion, as shown at $l$. It will be seen that the sliding leather loop on the strap when in its normal position rests within the hooks at the end of the frame, and the same is securely held in place, thereby preventing said leather loop from sliding rearward and out of place, and the offset in the bars in rear provides sufficient space for the sliding loop.

This hook is designed to be used with a neck-yoke, the breeching strap B extending from the breeching-ring forward to the frame, where it is connected, as at $l$, and the hooked end $a$ connecting with the ordinary ring in the end of said yoke and held thereto by the pivoted dog $m$. The strap $n$, connecting with the loop on the upper side bar of the frame, connects by its other end to the hame of the horse in the well known manner. It will thus be observed that I provide means whereby the breeching-strap can be readily adjusted and the leather loop thereof held in its proper place, and that it is simple in operation, durable, and at the same time cheap to manufacture.

What I claim is—

The within described breeching-hook, consisting of the hook $a$, provided with the pivoted dog $m$, the frame composed of the parallel side bars and cross-bar, and having the loop $c$, said parallel bars having formed in their ends the hooks providing slots $g$, the whole formed integral and provided with a detachable holding-bar, $i$, substantially as described.

In testimony whereof I affix my signature in presence of two witnesses.

DANIEL W. BROWNELL.

Witnesses:
 JOHN A. KENRICK,
 JOHN C. BRIMBLECORN.